US008988457B2

(12) United States Patent
Momosaki et al.

(10) Patent No.: US 8,988,457 B2
(45) Date of Patent: Mar. 24, 2015

(54) MULTI IMAGE-OUTPUT DISPLAY MODE APPARATUS AND METHOD

(75) Inventors: Kohei Momosaki, Mitaka (JP); Kouetsu Wada, Nishitama-gun (JP); Kenichi Tabe, Ome (JP); Tomonori Sakaguchi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 408 days.

(21) Appl. No.: 13/010,554

(22) Filed: Jan. 20, 2011

(65) Prior Publication Data

US 2011/0242123 A1    Oct. 6, 2011

(30) Foreign Application Priority Data

Mar. 31, 2010  (JP) ................................ 2010-084336

(51) Int. Cl.
G09G 5/00 (2006.01)
G06F 17/30 (2006.01)

(52) U.S. Cl.
CPC ....... *G06F 17/30056* (2013.01); *G06T 2210/52* (2013.01); *G09G 2352/00* (2013.01)
USPC ........... 345/619; 345/501; 345/505; 715/730; 715/726

(58) Field of Classification Search
CPC .................... G06F 17/30056; G09G 2352/00; G06T 2210/52
USPC ................... 345/619, 501, 505; 715/730, 726
See application file for complete search history.

(56) References Cited

U.S. PATENT DOCUMENTS

| 6,704,029 | B1 | 3/2004 | Ikeda et al. |
| 7,469,054 | B2 | 12/2008 | Aratani et al. |
| 7,574,101 | B2 | 8/2009 | Gohara et al. |
| 2003/0112260 | A1* | 6/2003 | Gouzu .......................... 345/716 |
| 2003/0112347 | A1* | 6/2003 | Wyman ..................... 348/231.99 |
| 2004/0044724 | A1* | 3/2004 | Bell et al. ....................... 709/203 |
| 2005/0128221 | A1 | 6/2005 | Aratani et al. |
| 2005/0238322 | A1 | 10/2005 | Gohara et al. |

(Continued)

FOREIGN PATENT DOCUMENTS

| JP | H11-239322 | 8/1999 |
| JP | 2000-299829 | 10/2000 |

(Continued)

OTHER PUBLICATIONS

Notification of Reason for Refusal mailed by the Japan Patent Office on May 10, 2011 in corresponding Japanese patent app. No. 2010-084336 in 6 pages.

Notification of Reason for Refusal mailed by the Japan Patent Office on Sep. 6, 2011 in corresponding Japanese patent app. No. 2010-084336 in 7 pages.

*Primary Examiner* — Michelle L Sams
(74) *Attorney, Agent, or Firm* — Knobbe, Martens, Olson & Bear LLP

(57) ABSTRACT

In one embodiment, there is provided an electronic device. The electronic device includes: a first generator configured to generate a first image display mode in which image processing including at least one of an effect processing and a transition processing is applied to one or more still images based on image features of the still images; a second generator configured to generate a second image display mode in which one or more still images are switched over successively; and a switching module configured to output any one of the first and second image display modes and switch between the first image display mode and the second image display mode.

10 Claims, 10 Drawing Sheets

(56) References Cited

U.S. PATENT DOCUMENTS

| | | |
|---|---|---|
| 2006/0069999 A1 | 3/2006 | Mitsuhashi |
| 2006/0127054 A1* | 6/2006 | Matsuyama ............... 386/96 |
| 2006/0129933 A1* | 6/2006 | Land et al. ............... 715/723 |
| 2006/0221222 A1* | 10/2006 | Hirasawa ............. 348/333.01 |
| 2007/0165968 A1 | 7/2007 | Terayoko |
| 2007/0299850 A1* | 12/2007 | Qian ........................ 707/10 |
| 2008/0309795 A1 | 12/2008 | Mitsuhashi et al. |
| 2009/0009530 A1* | 1/2009 | Araki et al. ............... 345/619 |
| 2009/0046033 A1* | 2/2009 | Siegel ....................... 345/1.3 |
| 2009/0249222 A1* | 10/2009 | Schmidt et al. .......... 715/751 |
| 2010/0042926 A1* | 2/2010 | Bull et al. ................. 715/732 |
| 2010/0145920 A1* | 6/2010 | Kirk et al. ................. 707/702 |
| 2011/0025714 A1* | 2/2011 | Ptucha et al. ............. 345/641 |
| 2012/0127196 A1* | 5/2012 | Landry ...................... 345/619 |

FOREIGN PATENT DOCUMENTS

| | | |
|---|---|---|
| JP | 2003-309815 | 10/2003 |
| JP | 2005-182196 | 7/2005 |
| JP | 2005-303907 A | 10/2005 |
| JP | 2006-005886 | 1/2006 |
| JP | 2006-129453 | 5/2006 |
| JP | 2006-173985 | 6/2006 |
| JP | 2006-238012 | 9/2006 |
| JP | 2007-096574 | 4/2007 |
| JP | 2007-194948 A | 8/2007 |
| JP | 2008-061032 | 3/2008 |
| JP | 2009-141678 | 6/2009 |

* cited by examiner

MULTI IMAGE-OUTPUT DISPLAY MODE APPARATUS AND METHOD

CROSS-REFERENCE TO RELATED APPLICATION

This application claims priority from Japanese Patent Application No. 2010-084336, filed on Mar. 31, 2010, the entire contents of which are hereby incorporated by reference.

BACKGROUND

1. Field

Embodiments described herein generally relate to an electronic device, an image output method and a computer-readable medium.

2. Description of the Related Art

An image reproducing device called Digital Photo Frame or the like has come into wide use recently. The Digital Photo Frame has a slide show function by which one or more still images, for example, stored in a card type storage medium, are displayed successively in predetermined timing. It is also general that a device such as a personal computer, a digital camera, etc. has a slide show function by which one or more still images are displayed successively in predetermined timing in the same manner as the Digital Photo Frame.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

According to exemplary embodiments of the present invention, there is provided an electronic device. The electronic device includes: a first generator configured to generate a first image display mode in which image processing including at least one of an effect processing and a transition processing is applied to one or more still images based on image features of the still images; a second generator configured to generate a second image display mode in which one or more still images are switched over successively; and a switching module configured to output any one of the first and second image display modes and switch between the first image display mode and the second image display mode.

An embodiment of the invention will be described below with reference to the drawings.

Figure 1:
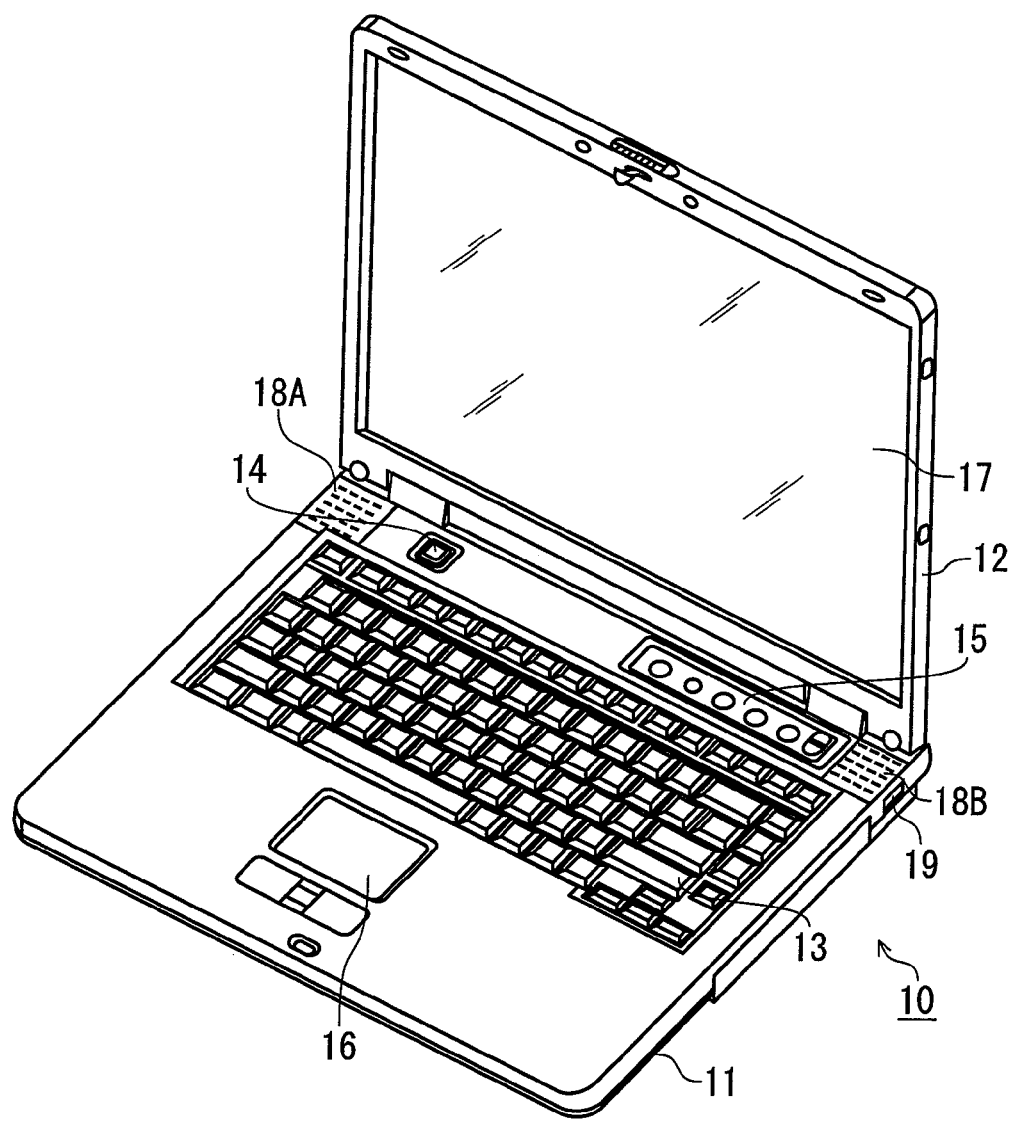
FIG. 1 is a perspective view showing the external appearance of an electronic device according to an embodiment of the invention.

FIG. 1 is a perspective view showing the external appearance of an electronic device according to an embodiment of the invention. For example, the electronic device may be implemented as a notebook type personal computer 10. As shown in FIG. 1, this computer 10 includes a computer body 11, and a display unit 12. An LCD (Liquid Crystal Display) 17 is incorporated in the display unit 12. The display unit 12 is attached to the computer body 11 so as to be rotatable between an open position where a top surface of the computer body 11 is exposed and a close position where the top surface of the computer body 11 is covered.

The computer body 11 has a housing shaped like a thin box. A keyboard 13, a power button 14 for powering on/off this computer 10, an input operation panel 15, a touch pad 16, speakers 18A and 18B, etc. are disposed in the top surface of the computer body 11. Various operation buttons are provided on the input operation panel 15.

For example, a USB (Universal Serial Bus) connector 19 for connecting a USB cable or a USB device according to the USB 2.0 standard is provided in a right side surface of the computer body 11. For example, an external display connection terminal (not shown) according to the HDMI (High-Definition Multimedia Interface) standard is provided in a rear surface of the computer body 11. The external display connection terminal is used for outputting a digital video signal to an external display.

Figure 2:
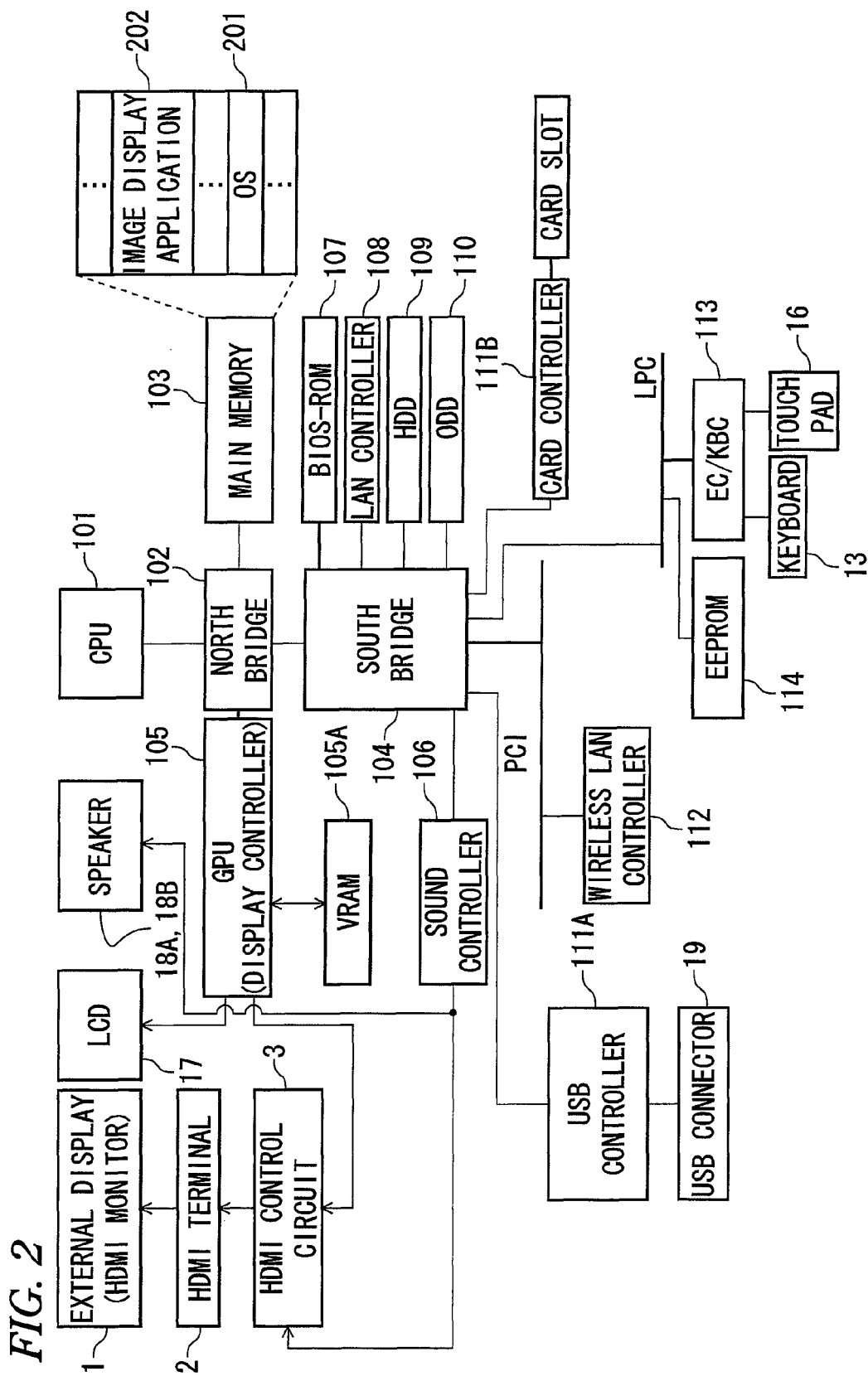
FIG. 2 is a block diagram showing the system configuration of the electronic device according to this embodiment.

FIG. 2 is a diagram showing the system configuration of this computer 10.

As shown in FIG. 2, this computer 10 includes a CPU (Central Processing Unit) 101, a north bridge 102, a main memory 103, a south bridge 104, a GPU (Graphics Processing Unit) 105, a VRAM (video RAM: Random Access Memory) 105A, a sound controller 106, a BIOS-ROM (Basic Input/Output System-Read Only Memory) 107, an LAN (Local Area Network) controller 108, a hard disk drive (HDD) 109, an optical disk drive (ODD) 110, a USB controller 111A, a card controller 111B, a wireless LAN controller 112, an embedded controller/keyboard controller (EC/KBC) 113, an EEPROM (Electrically Erasable Programmable ROM) 114, etc.

The CPU 101 is a processor which controls operations of respective portions in this computer 10. The CPU 101 executes various application programs such as an operating system (OS) 201 and an image display application program 202 which are loaded from the HDD 109 to the main memory 103. The image display application program 202 is software for displaying images, for example, stored in the HDD 109 etc. The image display application program 202 has a slide show display function and a photo movie display function. Here, the slide show display function is a function of displaying images continuously, for example, by using digital contents of still images (photographs, etc.) stored in the HDD 109 etc. The photo movie display function is a function of generating a series of motion images, for example, by using digital contents of images (photographs, etc.) stored in the HDD 109 etc., and displaying the motion images. The slide show display function and the photo movie display function will be described later more in detail.

The CPU 101 further executes a BIOS stored in the BIOS-ROM 107. The BIOS is a program for hardware control.

The north bridge 102 is a bridge device which connects a local bus of the CPU 101 and the south bridge 104 to each other. The north bridge 102 has a built-in memory controller for access control of the main memory 103. The north bridge 102 has a function of executing communication with the GPU 105 through a serial bus etc. according to the PCI EXPRESS standard.

The GPU 105 is a display controller which controls the LCD 17 used as a display monitor of this computer 10. A display signal produced by the GPU 105 is delivered to the LCD 17. The GPU 105 may send a digital video signal to an external display device 1 through an HDMI control circuit 3 and an HDMI terminal 2.

The HDMI terminal 2 is an external display connection terminal as described above. The HDMI terminal 2 may send non-compressed digital video and digital audio signals to the external display device 1 such as a television set by one cable. The HDMI control circuit 3 is an interface for sending a digital video signal to the external display device 1 called HDMI monitor through the HDMI terminal 2.

The south bridge 104 controls respective devices on a PCI (Peripheral Component Interconnect) bus and respective devices on an LPC (Low Pin Count) bus. The south bridge 104 has a built-in IDE (Integrated Drive Electronics) controller for controlling the HDD 109 and the ODD 110. The south bridge 104 further has a function of executing communication with the sound controller 106.

The sound controller 106 is a sound source device which outputs audio data to the speakers 18A and 18B or the HDMI control circuit 3. The LAN controller 108 is a wire communication device which executes wire communication, for example, according to the IEEE 802.3 standard. On the other hand, the wireless LAN controller 112 is a wireless communication device which executes wireless communication, for example, according to the IEEE 802.11g standard. The USB controller 111A executes communication with an external device, for example, according to the USB 2.0 standard (connected through the USB connector 19). For example, the UBS controller 111A is used for receiving an image data file, for example, stored in a digital camera. The card controller 111B executes writing/reading of data into/from a memory card such as an SD card inserted in a card slot provided in the computer body 11.

The EC/KBC 113 is a one-chip microcomputer in which an embedded controller for power management and a keyboard controller for controlling the keyboard 13 and the touch pad 16 are integrated. The EC/KBC 113 has a function of powering on/off this computer 10 in response to user's operation on the power button 14.

An example of functional configuration of the image display application program 202 operating on this computer 10 configured as described above will be described next with reference to FIG. 3. The aforementioned slide show display function and photo movie display function may be applied not only to still images stored in the HDD 109 but also to still image data 51 read from an external device (such as a digital camera or a memory card) through an interface portion (such as the USB controller 111A, the card controller 111B or the like).

Figure 3:
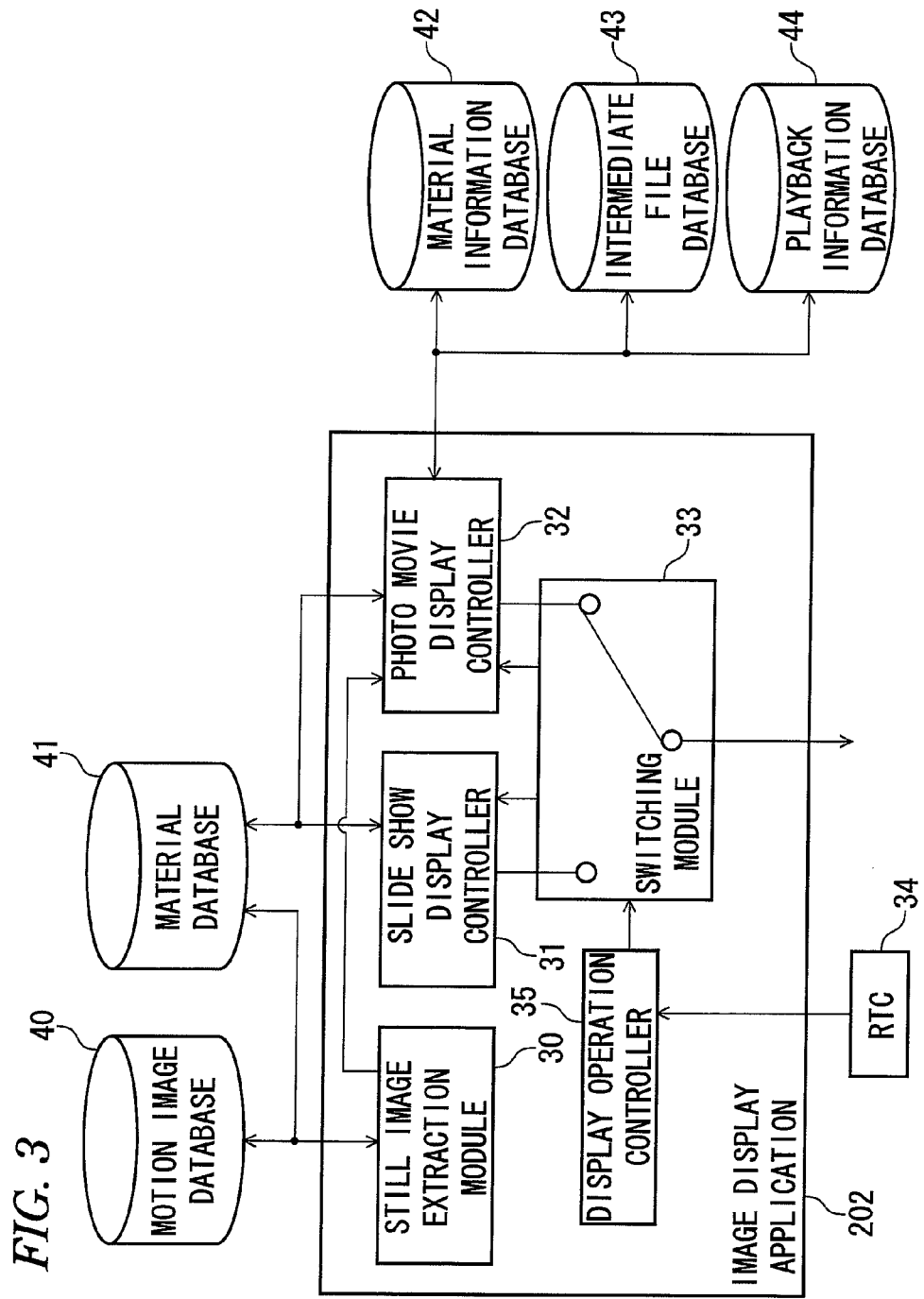
FIG. 3 is a block diagram showing the functional configuration of an image display application program executed by the electronic device according to this embodiment.

As shown in FIG. 3, the image display application program 202 includes a still image extraction module 30, a slide show display controller 31, a photo movie display controller 32, a switching module 33, and a display operation controller 35. A motion image database 40, a material database 41, a material information database 42, an intermediate file database 43 and a playback information database 44 are regions which are part of the HDD 109.

The still image extraction module 30 has a function of extracting a still image (one frame of user motion images) from user motion images which are, for example, shot by the user and stored in the motion image database 40. The user motion images are stored in the motion image database 40, so that the still image extraction module 30 extracts one frame of the user motion images and stores the frame as a still image in the material database. When a still image is extracted from the user motion images, the still image extraction module 30 calculates the shooting date and time of the extracted image based on the shooting date and time of the user motion images, that is, based on the shooting date and time of the top frame of the user motion images and the frame numbers of respective frames, and sends this information to the photo movie display controller 32. A method of utilizing this shooting date and time will be described later with reference to FIG. 5.

The slide show display controller 31 has a function of generating a slide show (second image display mode) by using still images stored in the material database 41. On this occasion, still images extracted from user motion images by the still image extraction module 30 may be used for generating a slide show. The slide show display controller 31 outputs the slide show to the switching module 33. The internal configuration of the slide show display controller 31 will be described later with reference to FIG. 4.

The photo movie display controller 32 has a function of generating a photo movie (first image display mode) by using various kinds of information (e.g. image features of each image, etc.) stored in the material database 41 and the material information database 42. When a photo movie is generated, the photo movie display controller 32 generates motion image information data (intermediate file) indicating the position (file path) where one or more still images (photographs) used in the photo movie are stored and the display timing when each of the one or more still images is displayed. The photo movie display controller 32 plays back motion images by displaying each of the one or more still images in predetermined display timing based on the motion image information data, and outputs the motion images to the switching module 33. The photo movie display controller 32 stores the motion image information data in the intermediate file database 43. The photo movie display controller 32 further stores playback history information, etc. at the time that the personal computer 10 plays back the photo movie, in the playback information database. In addition, still images extracted from user motion images by the still image extraction module 30 may be used for generating the photo movie. The internal configuration of the photo movie display controller 32 will be described later in detail with reference to FIG. 5.

The switching module 33 has a function of selectively outputting either of the input slide show and the input photo movie. The switching module 33 instructs the slide show display controller 31/photo movie display controller 32 to generate a slide show/photo movie based on an instruction given from the display operation controller 35, and outputs the slide show/photo movie to be displayed on the LCD 17. That is, the switching module 33 switches an output from one of the slide show (second image display mode) and the photo movie (first image display mode) to the other.

An RTC 34 is a timer function-including module (Real Time Clock) which has a function of measuring the current time. The RTC 34 outputs time information to the display operation controller 35.

The display operation controller 35 has a function of determining whether a slide show or a photo movie should be outputted by the switching module 33, based on the time information inputted from the RTC 34. The display operation controller 35 sends an instruction to the switching module 33 to switch the output from one of the slide show and the photo movie to the other when the time inputted from the RTC 34 is predetermined time.

As described above, the image display application program 202 has a function of selectively outputting either of the slide show and the photo movie based on the time information. That is, the output can be switched from a photo movie to a slide show when the photo movie is outputted, or the output can be switched from a slide show to a photo movie when the slide show is outputted.

The image display application program 202 may output images which are part of user motion images stored as motion images in the personal computer 10, as a slide show or a photo movie.

The internal configuration of the slide show display controller 31 will be described next with reference to FIG. 4.

Figure 4:
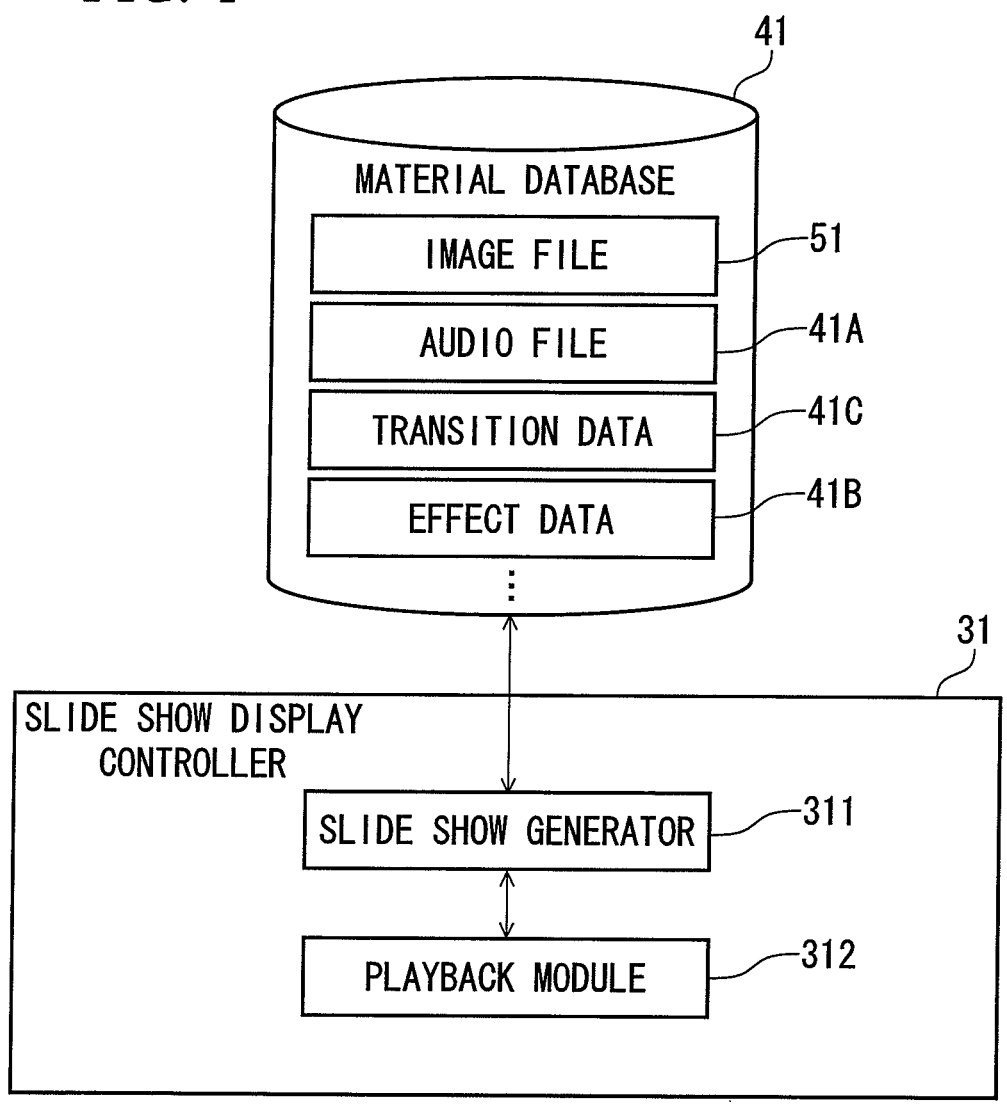
FIG. 4 is a block diagram showing the functional configuration of a slide show display controller of the image display application program executed by the electronic device according to this embodiment.

As shown in FIG. 4, the slide show display controller 31 has a slide show generator 311, and a playback module 312.

The slide show generator 311 has a function of generating a slide show in accordance with a slide show generation instruction received from the switching module 33. The slide show generator 311 generates a slide show based on data stored in the material database 41.

The material database 41 is a storage region in which material data such as still image data 51, audio data 41A, effect data 41B, transition data 41C, etc. are stored and which is prepared in the HDD 109. The audio data 41A include data such music, effect sound, etc. used as BGM of a photo movie. The effect data 41B include data for applying effects such as zoom, revolution, slide-in/slide-out, superposition display of an image of a frame or the like, fade-in/fade-out, etc. to still images used in a slide show/photo movie. The transition data 41C include transition data such as zoom, revolution, slide-in/slide-out, superposition display of an image of a frame or the like, fade-in/fade-out, etc. used when a screen (still image) is switched in a slide show/photo movie. Representative thumbnail images of respective photo movies and face images of personages in each photo movie may be further stored in the material database 41.

The playback module 312 plays back a slide show generated by the slide show generator 311. The playback module 312 outputs the played-back slide show to the switching module 33.

An example of operation of the slide show generator 311 at the time of generating a slide show will be described below.

Upon reception of a slide show creation instruction from the switching module 33, the slide show generator 311 first reads one or more still image data 51 from the material database 41. The slide show generator 311 reads corresponding effect data 41B and transition data 41C from the material database 41 likewise.

Then, the slide show generator 311 generates a slide show by applying effects to the read still image data 51 based on effect parameters included in effect information and applying transitions to the still image data 51 based on transition parameters included in transition information. The effect parameters and transition parameters may include the position and ratio of zoom, the position and angle of revolution, the speed of slide-in/slide-out, the position and size of superposition display of an image of a frame or the like, the time of fade-in/fade-out, etc., as described above. The slide show generator 311 generates a slide show in which still image data 51 subjected to effects and transitions will be displayed, based on values designated by such parameters. On this occasion, the effect processing and transition processing are not performed bases on image features of images but performed by effects and transitions selected at random.

The slide show generated by the slide show generator 311 is played back by the playback module 312 and outputted to the switching module.

The slide show generator 311 reads still image data 51 from the material database 41 at random and stores information concerned with the read still image data 51. For example, it is conceived that the information concerned with the read still image data 51 is file path, file name, etc. of the still image data 51. The information is extracted from each file of the still image data 51. The slide show generator 311 generates a slide show including images which have been not displayed as a slide show yet, based on the information concerned with the still image data 51 in such a rule that still image data 51 are read from the material database 41 at random but still image data 51 once read are not read any more. However, for example, when all still image data 51 stored in the material database 41 have been already displayed as a slide show or after the image display application program is terminated once, this rule is invalidated so that even once displayed still image data may be displayed again.

The slide show generator 311 further reads still image data 51 from the material database 41 during the display of a slide show. Then, the slide show generator 311 generates a slide show continued to the currently played-back slide show by using the read still image data 51. In this manner, a slide show is generated and played back continuously unless a slide show stop instruction is received. That is, a slide show does not constitute motion images which can be handled as a lump. Moreover, because the slide show generator 311 does not store information concerned with the sequence of still images outputted as a slide show and effect data, transition data, etc. used for generating the slide show, it is rare to generate a slide show quite the same as a once generated slide show.

Figure 5:
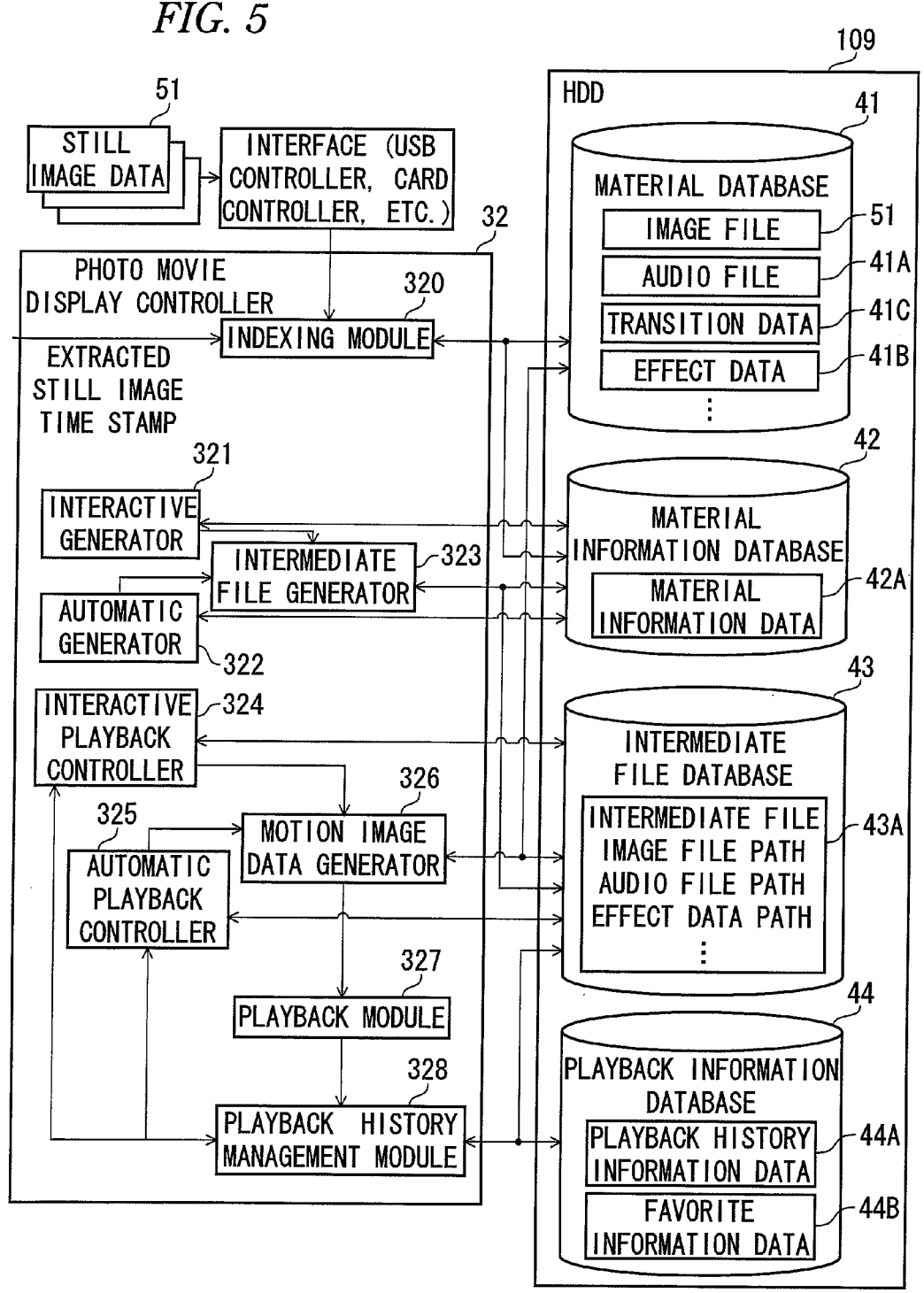
FIG. 5 is a block diagram showing the functional configuration of a photo movie display controller of the image display application program executed by the electronic device according to this embodiment.

The internal configuration of the photo movie display controller 32 will be described next with reference to FIG. 5.

The photo movie display controller 32 includes an indexing module 320, an interactive generator 321, an automatic generator 322, an intermediate file generator 323, an interactive playback controller 324, an automatic playback controller 325, a motion image data generator 326, a playback module 327, and a playback history management module 328.

The indexing module 320 executes an indexing process for generating material information data 42A corresponding to each still image 51. The material information data 42A is used for retrieving a target still image from still image data 51 stored in the material database 41 (HDD 109).

For example, a face detection process for detecting a face image from still image data 51 is executed in the indexing process. With respect to a still image containing a plurality of face images, the plurality of face images are detected respectively. For example, face image detection can be performed by analyzing image features of still image data and searching for regions having image features analogous to face image feature samples prepared in advance. The face image feature samples are image feature data obtained by statistically processing respective face image features of a large number of persons. The position (coordinates), size, frontality, etc. of each of face images contained in a still image are detected by the face detection process. In this manner, the indexing process detects image features of images.

The indexing module 320 may classify detected face images. The indexing module 320 classifies a plurality of face images detected from still image data 51 into groups by face images which are estimated to be of one and the same person. The indexing module 320 may further identify a person corresponding to each detected face image. In this case, for example, the indexing module 320 uses a face image feature sample of a person to be identified and determines whether the detected face image is of the person or not.

The indexing module 320 further executes an event detection process for estimating an event based on objects contained in each still image, shooting date and time, etc. The indexing module 320 determines an event estimated from the still image based on correspondence between the date of the event such as birth day, Christmas, etc. and the shooting date and time of the still image.

The indexing module 320 may execute a grouping process for grouping still images based on the shooting date and time. When, for example, the difference in the shooting date and time between two still image data 51 time-continuous in terms of the shooting date and time is smaller than a threshold, the indexing module 320 classifies the two still image data 51 into the same group. When, for example, the difference in the shooting date and time between two still image data 51 is not smaller than the threshold value, the indexing module 320 classifies the two still image data 51 into different groups. When still image data 51 are respective images of frames constituting motion image data, the indexing module 320 detects so-called scene change points where image features of images change widely before and behind, and classifies the still image data 51 into groups so that each scene is one section. In this manner, the indexing module 320 determines groups to which respective still images belong.

The indexing module 320 stores still image data 51 read from an external device through an interface portion, in the material database 41. The indexing module 320 applies the aforementioned indexing process to the stored still image data 51. The indexing module 320 stores material information data 42A including face image information, event information, group information, etc. obtained by the indexing process, in the material information database 42.

Incidentally, the indexing module 320 may monitor a predetermined directory in the HDD 109 and apply an indexing process to still image data 51 newly stored in this directory. The indexing module 320 stores material information data 42A including face image information, event information, group information, etc. obtained by the indexing process applied to the still image data 51 in this directory, in the material information database 42 likewise. Incidentally, for example, the predetermined directory corresponds to the material database 41. The indexing module 320 receives the time stamp (date and time information) of a still image sent when the still image extraction module 30 extracts the still image from user motion images, and stores this information in material information data 42A corresponding to the still image based on the time stamp.

The material information database 42 is a storage region in which material information data 42A are stored and which is prepared in the HDD 109.

Figure 6:
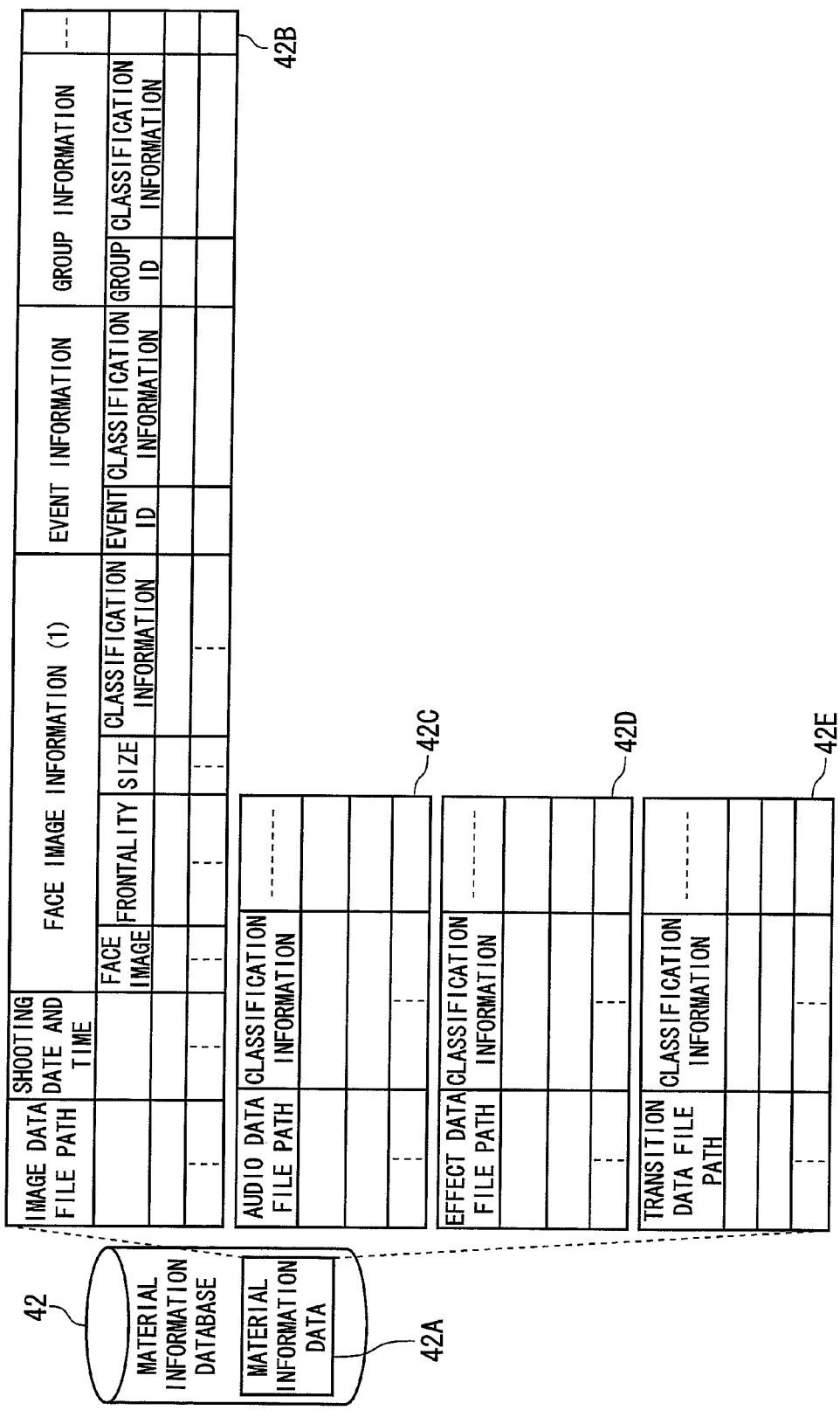
FIG. 6 is a view showing an example of material information used by the photo movie display controller of the image display application program executed by the electronic device according to this embodiment.

The material information data will be described in detail with reference to FIG. 6. FIG. 6 shows an example of configuration of the material information data 42A.

The material information data 42A includes image information data 42B, audio information data 42C, effect information data 42D, and transition information data 42E. The image information data 42B includes image data file path, shooting date and time, face image information, event information, group information, etc. in accordance with each still image 51.

The image data file path indicates a file path of each still image data 51.

The shooting date and time is time information indicating the shooting date and time of each still image 51. Incidentally, when the still image is a still image extracted from user motion images, the shooting date and time (time stamp) of the still image transmitted from the still image extraction module 30 is indicated here.

The face image information includes information concerned with the face image of each person caught in each still image 51. The face image information includes face image extracted by the indexing module 320, and frontality, size and classification information of the face image. The frontality indicates the degree of front from which an image of a face is shot. The size indicates the size of the extracted face image. The classification information indicates information of a face image group estimated to be of one and the same person by the indexing module 320. Incidentally, the classification information may indicate information of a person identified based on the face image. When the still image 51 includes persons, pieces of face image information corresponding to the number of persons are recorded as the face image information.

The event information indicates information of an event corresponding to the still image 51 detected by the event detection process performed by the indexing module 320. The event information includes event ID, classification information, etc. The event ID is identification information uniquely allocated to each event. Incidentally, the event ID may be the name of each event. The classification information is information indicating a category into which the event is classified, the attribute of the event, etc.

The group information indicates information of a group into which the still image 51 is classified by the grouping process performed by the indexing module 320. The group information includes group ID, classification information, etc. The group ID is identification information uniquely allocated to each group. Incidentally, the group ID may be the name of each group. The classification information is information indicating a category into which the group is classified, the attribute of the group, etc.

The audio information data 42C includes audio data file path, classification information, etc. in accordance with each audio data 41A. The audio data file path indicates a file path of each audio data 41A. The classification information is information indicating a category into which audio data 41A is classified, and the attribute of audio data.

The effect information data 42D includes effect data file path, classification information in accordance with each effect data 41B. The effect data file path indicates a file path of each effect data 41B. The classification information is information indicating a category into which effect data 41B is classified, and the attribute of effect data.

The transition information data 42E includes transition data file path, classification information in accordance with each transition data 41C. The transition data file path indicates a file path of each transition data 41C. The classification information is information indicating a category into which transition data 41C is classified, and the attribute of transition data.

The use of the material information data 42A permits each still image data 51 to be determined as to whether there is any face image included in the still image or not, the number of face images included in the still image, whether there is any still image corresponding to the designated event or not, which group the still image belongs to, etc. In other words, the use of the material information data 42A permits still image data 51 including an image of a target person, still image data 51 including an image of a target person and corresponding to a specific event to be retrieved rapidly from one or more still image data 51 stored in the HDD 109. The photo movie display controller 32 selects one or more still image data satisfying a predetermined condition from one or more still image data 51 stored in the material database 41, by using the material information data 42A. The photo movie display controller 32 generates and plays back (displays) a photo movie by using selected one or more still image data. That is, the photo movie display controller 32 may generate (produce) and play back motion images (photo movie) based on image features of images.

The photo movie display controller 32 has a function of interactively generating a photo movie (interactive generation mode), and a function of automatically generating a photo movie (automatic generation mode) as photo movie generation functions. The function of interactively generating a photo movie is, for example, a function of generating a photo movie by using one or more still images satisfying a condition designated on an operation screen (GUI) by the user. The function of automatically generating a photo movie is, for example, a function of generating a photo movie by using one or more still images including a newly coming still image, a still image related to the date and time of creation, a still image selected at random, etc.

The photo movie display controller 32 has a function of interactively playing back a photo movie (interactive playback mode), and a function of automatically playing back a photo movie (automatic playback mode) as photo movie playback functions. The function of interactively playing back a photo movie is, for example, a function of playing back a photo movie selected on an operation screen (GUI) by the user. The function of automatically playing back a photo movie is, for example, a function of playing back a newly coming photo movie, a photo movie related to the date and time of playback, a photo movie selected at random, etc.

First, a process for generating a photo movie in the interactive generation mode will be described below. The interactive generator 321 determines a photo movie creation condition in accordance with a user's instruction. Firstly, the interactive generator 321 selects one or more still images designated by the user from still image data 51. The interactive generator 321 may select one or more still images satisfying a condition such as a person designated by the user, an event, shooting date and time, a group, etc. from still image data 51. The interactive generator 321 may select one or more still images identical or related in a person, an event, shooting date and time, a group, etc. to the still image designated by the user from still image data 51.

Then, the interactive generator 321 selects audio data, effect data and transition data designated by the user from audio data 41A, effect data 41B and transition data 41C respectively. Incidentally, the interactive generator 321 may select audio data, effect data and transition data having classification information or attribute corresponding to a style (such as ceremony, happy, etc.) designated by the user. The interactive generator 321 may select audio data, effect data and transition data having classification information or attribute suitable for one or more still images selected according to a user's instruction. A plurality of data may be selected as each of audio data, effect data and transition data. When a plurality of data are selected as each of audio data, effect data and transition data, for example, different effects may be applied to one or more still images respectively in one photo movie and a different transition may be applied whenever the still image is switched so that audio data used as BGM can be changed in the middle of the photo movie. Incidentally, the interactive generator 321 may further select any still image suitable for the style designated by the user or audio data used as BGM from selected one or more still images.

The interactive generator 321 determines audio parameters indicating output timing of selected audio data, etc., effect parameters indicating any still image to which selected effect data is applied, output timing of selected effect data, etc., and transition parameters indicating switching (still images before and after switching) of the still image to which selected transition data is applied, output timing of selected transition data, etc. The effect parameters and transition parameters may include the position and ratio of zoom, the position and angle of revolution, the speed of slide-in/slide out, the position and size of superposition display of an image of a frame or the like, the time of fade-in/fade-out, etc. For example, values set on an operation screen by the user are used as the parameters. Alternatively, parameters corresponding to the style designated by the user may be used.

The interactive generator 321 outputs file paths of selected one or more still images, audio data, effect data and transition data, and parameters (audio parameters, effect parameters and transition parameters) corresponding to respective data to the intermediate file generator 323.

The intermediate file generator 323 generates an intermediate file 43A by using file paths of one or more still images, audio data, effect data and transition data and parameters corresponding to respective data, outputted from the interactive generator 321. The intermediate file 43A includes motion image information data indicating the position (file path) where each of one or more still images selected from still image data 51 is stored, and display timing in which each of one or more still images is displayed on a screen. More specifically, the intermediate file 43A includes file paths indicating the storage positions of one or more still images, a file path of effect data applied to each still image and effect parameters, a file path of transition data applied to change of the still image and transition parameters, and a file path of audio data outputted during display of each still image and audio parameters. For example, the intermediate file 43A is written in an XML format.

Figure 7:
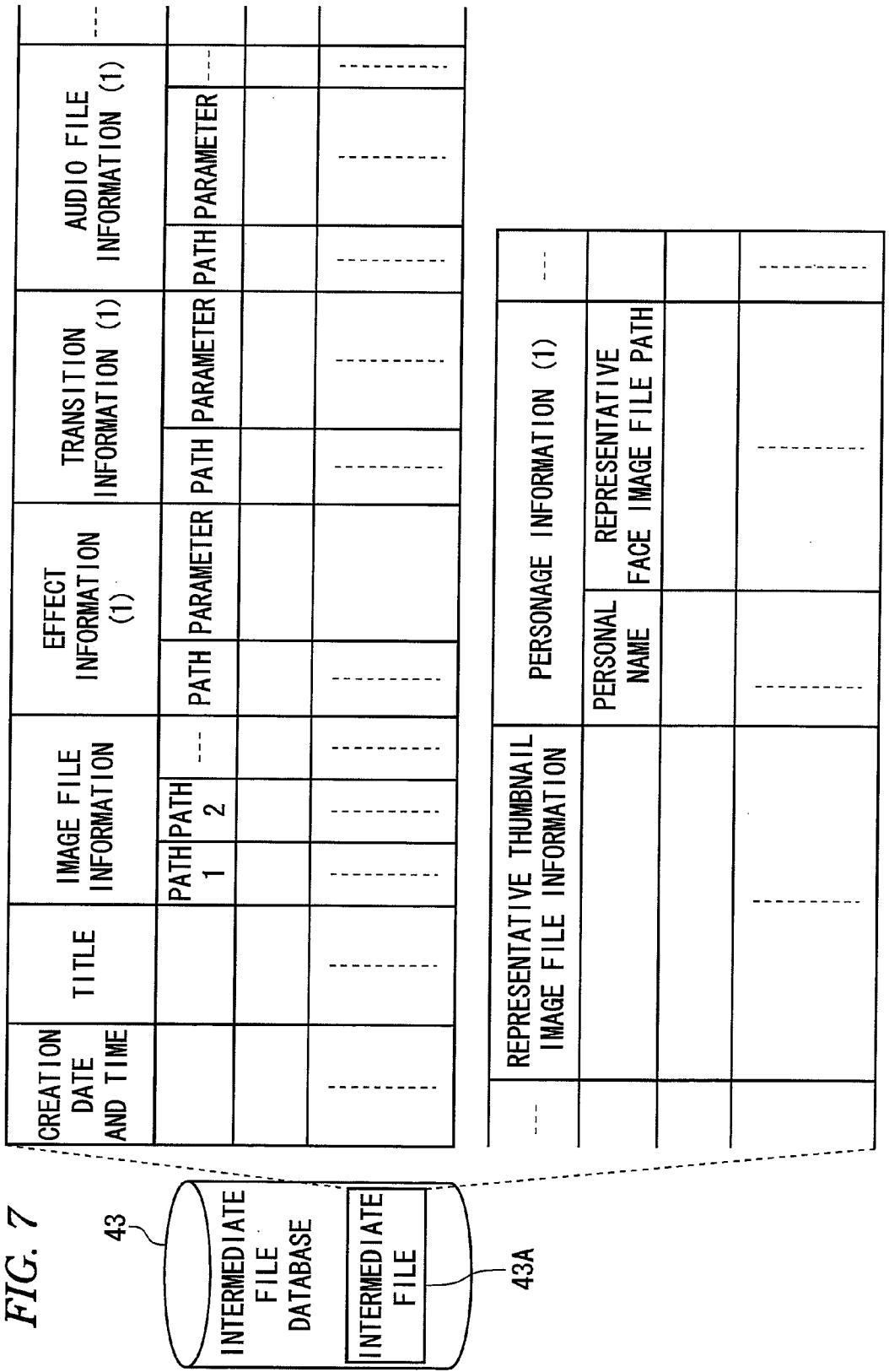
FIG. 7 is a view showing an example of an intermediate file used by the photo movie display controller of the image display application program executed by the electronic device according to this embodiment.

FIG. 7 shows an example of configuration of the intermediate file 43A. The intermediate file 43A includes information such as the creation date and time of a photo movie, the title of the photo movie, image file information, effect information, transition information, audio file information, representative thumbnail image file information, personage information, etc.

The creation date and time is time information indicating the date and time of creation of a photo movie. The title is a name such as a title given to the photo movie.

The image file information is information indicating the file path of each of one or more still images 51 (image files)

included in the photo movie. The effect information includes file paths indicating effect data 41B, and effect parameters used for applying effects to still images. The transition information includes file paths indicating transition data 41C, and transition parameters used for applying transition to change of each still image. The audio file information includes file paths of audio data 41A (audio data files) included in the photo movie, and audio parameters indicating output timing of audio data, etc. in the photo movie. The representative thumbnail image file information is information indicating the file path of a thumbnail image representative of the photo movie. The personage information is information indicating the names of personages (names of persons) in the photo movie, and file paths of face images of the persons. Incidentally, the intermediate file 43A need not be a data file but may be a data group (record) written in a table in a database.

The intermediate file generator 323 stores the intermediate file 43A in the intermediate file database 43. Incidentally, information designated by the user may be written in the title, representative thumbnail image file information and personage information included in the intermediate file 43A or information determined suitably based on still images, etc. used in the photo movie may be written therein.

The image display application 202 plays back motion image data based on the intermediate file 43A in response to a photo movie playback request. That is, motion image data for playing back a photo movie are generated based on the intermediate file 43A corresponding to the photo movie (i.e. the intermediate file 43A in which the configuration of the photo movie is written) when a photo movie playback request is issued. Accordingly, because the intermediate file 43A corresponding to the photo movie and still image data 51, audio data 41A, effect data 41B, transition data 41C, etc. used in the photo movie are stored in a storage device such as the HDD 109, it is unnecessary to store motion image data per se large in the quantity of data. Accordingly, the use of the intermediate file 43A corresponding to the photo movie permits the quantity of data in the photo movie to be reduced. That is, because the intermediate file 43A does not include actual data such as image data, audio data, etc. but includes information of link to these data, the quantity of data corresponding to the photo movie can be reduced.

A process for generating a photo movie in an automatic creation mode will be described next. First, the automatic generator 322 selects one or more still images used in a photo movie from still image data 51. For example, the automatic generator 322 selects a newly coming still image, a still image related to the date and time of creation, a still image selected at random, etc. as still images used in the photo movie. The automatic generator 322 further selects audio data, effect data, transition data, etc. suitable for selected one or more still images.

The automatic generator 322 determines audio parameters indicating output timing of selected audio data, etc., still images to which selected effect data are applied and effect parameters indicating output timing of effect data etc., and switching of still images to which selected transition data are applied (still images before and after switching) and transition parameters indicating output timing of transition data. The effect parameters and transition parameters may include the position and ratio of zoom, the position and angle of revolution, the speed of slide-in/slide-out, the position and size of superposition display of an image of a frame or the like, the time of fade-in/fade-out, etc. For example, values suitable for the shooting date and time of each of selected one or more still images, face image information, event information, group information, etc. are set as these parameters. That is, a photo movie may be generated in accordance with image features of selected one or more still images.

The automatic generator 322 outputs file paths of selected one or more still images, audio data, effect data and transition data, and parameters (audio parameters, effect parameters and transition parameters) corresponding to respective data to the intermediate file generator 323.

The intermediate file generator 323 produces an intermediate file 43A by using file paths of one or more still images, audio data, effect data and transition data and parameters corresponding to respective data, outputted from the automatic generator 322. The intermediate file 43A includes motion image information data indicating the position (file path) where each of one or more still images selected from still image data 51 is stored, and display timing in which each of one or more still images is displayed on a screen. More specifically, the intermediate file 43A includes file paths indicating the storage positions of one or more still images, a file path of effect data applied to each still image and effect parameters, a file path of transition data applied to change of the still image and transition parameters, and a file path of audio data outputted during display of each still image and audio parameters. The intermediate file 43A has the same configuration as described above with reference to FIG. 5. The intermediate file generator 323 stores the produced intermediate file 43A in the intermediate file database 43. Incidentally, information designated by the user may be written in the title, representative thumbnail image file information and personage information included in the intermediate file 43A or information determined suitably based on still images, etc. used in the photo movie may be written therein.

Incidentally, the automatic generator 322 may generate photo movies automatically (successively) while the image display application 202 is operating. That is, when the image display application 202 is operating in an automatic creation mode, photo movies may be generated automatically (successively).

A process of playing back a photo movie in an interactive playback mode will be described next. The interactive playback controller 324 plays back a photo movie selected by the user. Specifically, the interactive playback controller 324 displays a list of generated photo movies and a photo movie playback history list on a screen. For example, a title, a representative thumbnail image, names and face images of personages, etc. in each photo movie are displayed as the list of photo movies.

In response to selection of a photo movie from the list, the interactive playback controller 324 reads an intermediate file 43A corresponding to the selected photo movie from the intermediate file database 43. Then, the interactive playback controller 324 outputs the read intermediate file 43A to the motion image data generator 326.

The motion image data generator 326 generates motion image data based on the intermediate file 43A outputted from the interactive playback controller 324. Specifically, the motion image data generator 326 generates motion image data based on image file information, effect information, transition information, audio file information, etc. included in the intermediate file 43A.

First, the motion image data generator 326 reads still image data 51 from the material database 41 based on the file paths of one or more still images included in the image file information. Similarly, the motion image data generator 326 reads corresponding effect data 41B, transition data 41C and audio data 41A from the material database 41 based on the file paths of effect data included in the effect information, the file paths of transition data included in the transition information and the file paths of audio data included in the audio file information.

Then, the motion image data generator 326 applies effects to the read still image data 51 based on effect parameters included in the effect information and applies transitions to the still image data 51 based on transition parameters included in the transition information to thereby generate motion image data. As described above, the effect parameters and transition parameters may include the position and ratio of zoom, the position and angle of revolution, the speed of slide-in/slide out, the position and size of superposition display of an image of a frame or the like, the time of fade-in/fade-out, etc. The motion image data generator 326 generates motion image data so that the still image data 51 to which effects and transitions are applied are displayed based on values designated in the parameters.

The motion image data generator 326 combines audio data with the motion image data based on audio parameters included in the audio file information. The motion image data generator 326 generates motion image data combined with the audio data based on values designated in timing information, sound volume information, etc. included in the audio parameters.

A process of playing back a photo movie in an automatic generation mode will be described next. For example, the automatic playback controller 325 selects a newly coming photo movie, a photo movie related to the date and time of creation, a photo movie selected at random, etc. as a photo movie to be played back. The automatic playback controller 325 reads an intermediate file 43A corresponding to the selected photo movie from the intermediate file database 43. Then, the automatic playback controller 325 outputs the read intermediate file to the motion image data generator 326.

The motion image data generator 326 generates motion image data based on the intermediate file 43A outputted from the automatic playback controller 325. Specifically, the motion image data generator 326 generates motion image data based on image file information, effect information, transition information, audio file information, etc. included in the intermediate file 43A. The detailed process for generating motion image data is the same as the motion image data generating process in the interactive playback mode. Incidentally, the automatic playback controller 325 may determine photo movies to be played back automatically (successively) while the image display application 202 is operating. That is, when the image display application 202 is operating in an automatic playback mode, photo movies may be played back automatically (successively).

The motion image data generator 326 may generate motion image data (photo movie) based on file paths of selected one or more still images, audio data, effect data and transition data and parameters (audio parameters, effect parameters and transition parameters) corresponding to respective data, outputted from the interactive generator 321 or the automatic generator 322. In this case, while the motion image data generator 326 generates motion image data based on the information indicating the file paths and parameters outputted from the interactive generator 321 or the automatic generator 322, the intermediate file generator 323 generates an intermediate file 43A based on the information indicating the file paths and parameters. That is, while a photo movie based on a condition designated in the interactive generator 321 or the automatic generator 322 is played back, an intermediate file 43A corresponding to the photo movie may be generated and stored so that the intermediate file 43A can be used when the photo movie is played back again. The photo movie is a video to be handled as a lump. When, for example, the user issues an instruction to generate a photo movie for a predetermined time, the photo movie display controller 32 generates and displays the photo movie so that the playback time of the photo movie is equal to the predetermined time.

The playback module 327 plays back motion image data (photo movie) generated by the motion image data generator 326. The playback module 327 outputs the played-back motion image data to the switching module 33.

The playback history management module 328 stores history information data indicating motion image data (photo movie) played back by the playback module 327. The playback history management module 328 records the history information data on playback history information data 44A stored in the playback information database 44. For example, in response to completion of playback of a photo movie by the playback module 327, the playback history management module 328 stores history information data indicating the photo movie. For example, the playback history management module 328 stores history information data indicating a predetermined number of photo movies that are new in terms of playback date and time among played-back photo movies. That is, the playback history management module 328 deletes history information data indicating photo movies that are old in terms of playback date and time from the playback history information data 44A successively.

The playback history management module 328 may store information indicating photo movies designated by the user as favorite information data. The playback history management module 328 records the favorite information data on favorite information data 44B stored in the playback information database 44. The playback history management module 328 stores favorite information data indicating designated photo movies in response to a user's instruction through an operation screen or the like.

Figure 8:
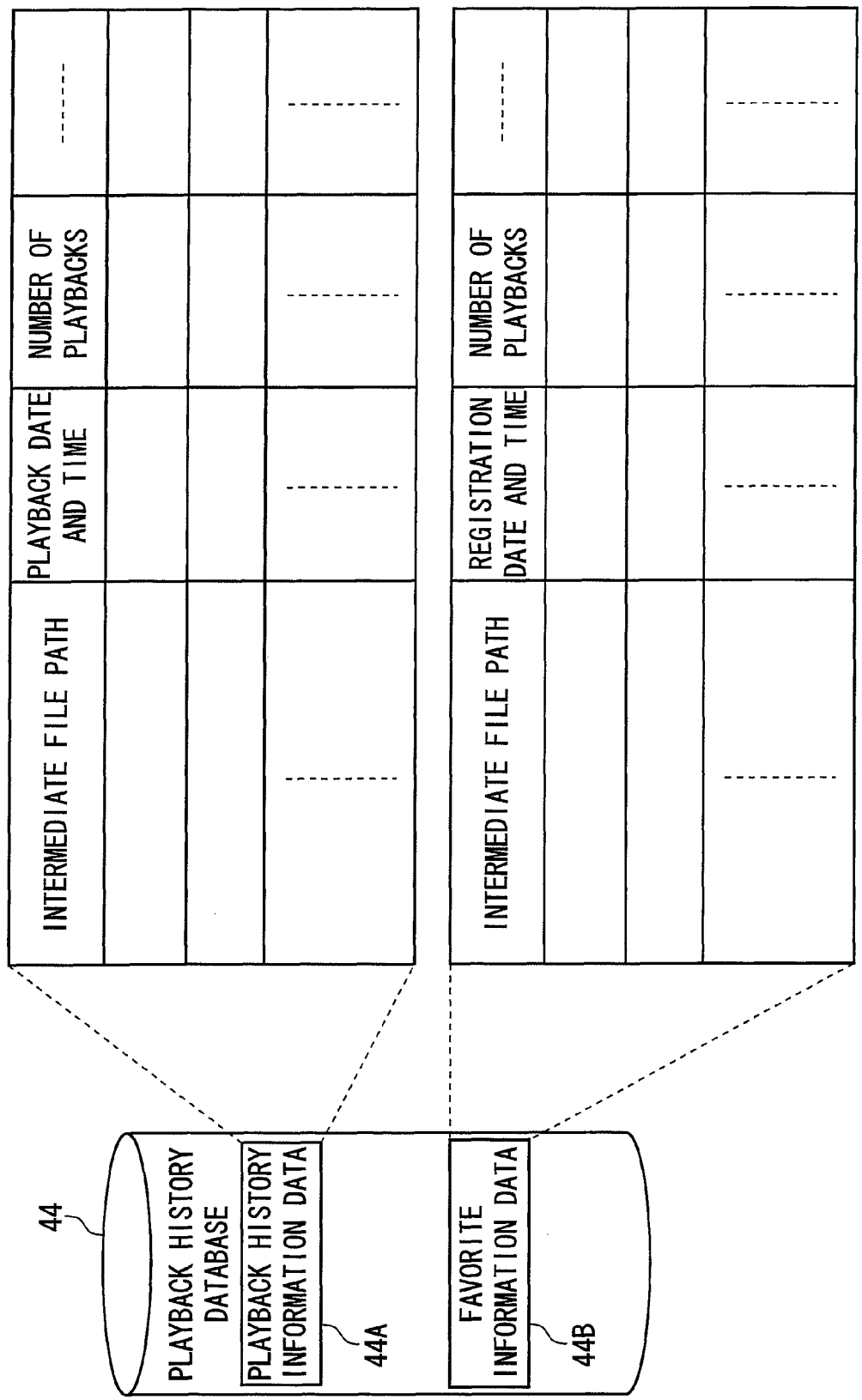
FIG. 8 is a view showing an example of playback history information used by the photo movie display controller of the image display application program executed by the electronic device according to this embodiment.

FIG. 8 shows an example of configuration of the playback history information data 44A and favorite information data 44B stored in the playback information database 44.

The playback history information data 44A includes an intermediate file path, the date and time of playback, the number of playbacks, etc. The intermediate file path indicates the file path of an intermediate file 43A corresponding to a played-back photo movie. The date and time of playback is time information indicating the date and time of playback of the photo movie. The number of playbacks indicates the number of times by which the photo movie is played back.

The favorite information data 44B includes an intermediate file path, the date and time of registration, the number of playbacks, etc. The intermediate file path indicates the file path of an intermediate file 43A corresponding to the photo movie designated as a favorite. The date and time of registration is time information indicating the date and time of registration of the photo movie as a favorite photo movie. The number of playbacks indicates the number of times by which the photo movie is played back.

The interactive playback controller 324 reads playback history information data 44A from the playback information database 44 and displays a list of played-back photo movies on a screen (LCD 17). The interactive playback controller 324 may display a list of played-back photo movies, for example, in order of the date and time of creation, the date and time of playback, or the like.

In addition, the interactive playback controller 324 reads favorite information data 44B from the playback information database 44 and displays a list of favorite photo movies on a screen (LCD 17). The interactive playback controller 324 may display a list of favorite photo movies, for example, in order of the date and time of creation, the date and time of registration, or the like.

The interactive playback controller 324 detects a photo movie selected from the list of played-back photo movies or the list of favorite photo movies, and reads an intermediate file 43A corresponding to the photo movie from the intermediate file database 43. The motion image data generator 326 generates motion image data based on the read intermediate file 43A. Then, the playback module 327 plays back the motion image data and displays the motion image data on a screen.

Each of the photo movie generated in the interactive creation mode and the photo movie generated in the automatic creation mode may be generated based on a condition varying according to change of the date and time of creation or a condition determined at random. There is a possibility that new still image data 51 or the like will be added to the material database 41 at any time. For this reason, there is a high possibility that the image display application 202 will generate different photo movies every time. In other words, there is a possibility that the image display application 202 will hardly generate one and the same photo movie even when the user designates the same creation condition. Therefore, when, for example, the user wants to play back a once played-back photo movie again, it is necessary to retrieve the photo movie from photo movies. There is however a possibility that the photo movie will be hardly retrieved when a great deal of photo movies have been generated as in the case where photo movies are generated in the automatic creation mode.

Therefore, as described above, the image display application 202 according to the embodiment stores a photo movie playback history as playback history information data 44A, and presents a list of photo movies based on the playback history information data 44A to the user. As a result, the user can find the recently played-back photo movies easily. The image display application 202 stores photo movies designated by the user as "favorite" in the favorite information data 44B, and presents a list of photo movies based on the favorite information data 44B to the user. As a result, the user can find out the favorite photo movies easily. The display of a list of photo movies using playback history information or favorite information is particularly effective in the case where a great deal of photo movies are generated as in the case where photo movies are generated from still image data 51 stored in a storage device such as the HDD 109 and played back automatically successively.

A flow of processing concerned with an indexing process in this embodiment will be described next.

Figure 9:
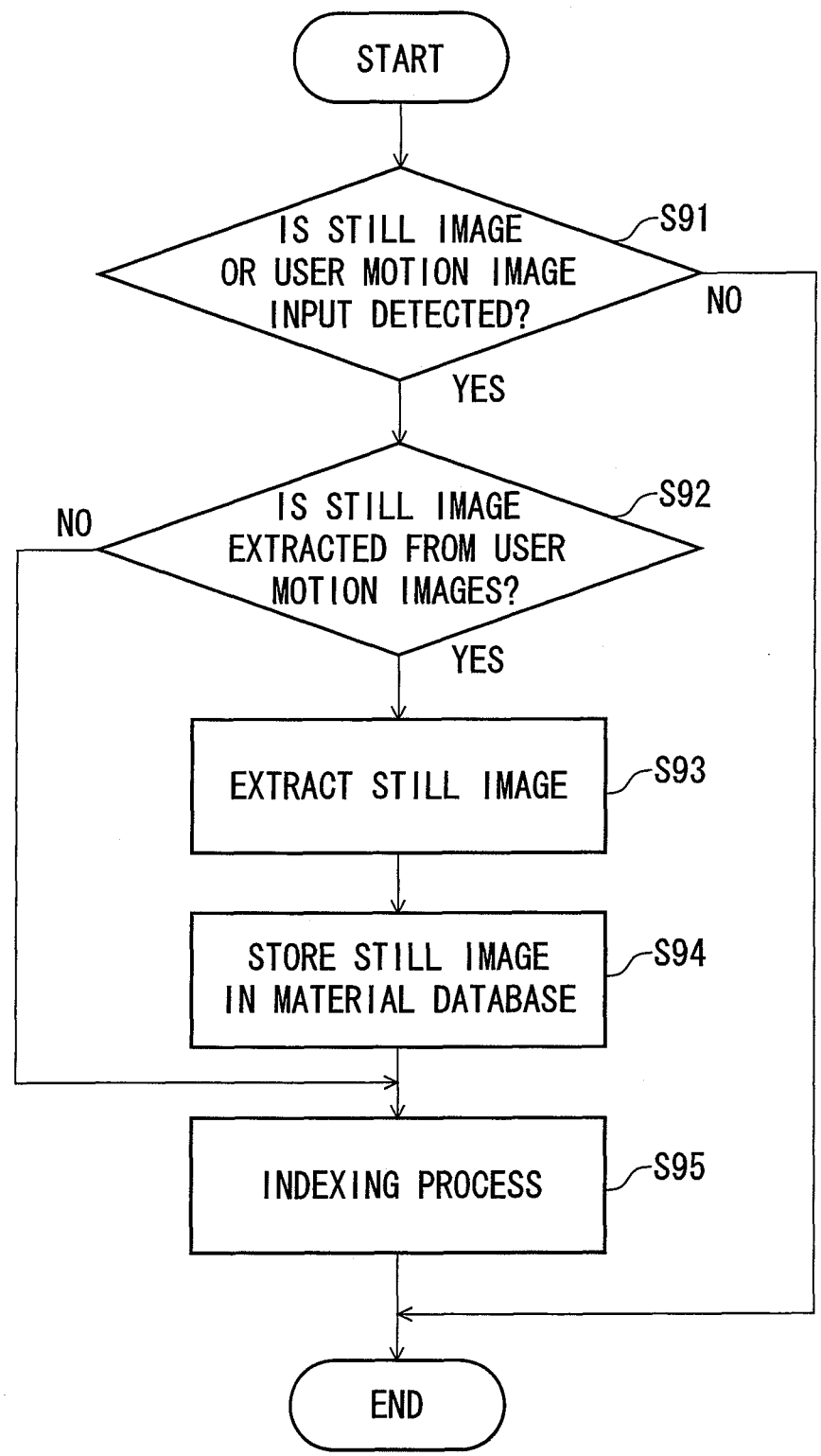
FIG. 9 is a flow chart showing an example of processing concerned with an indexing process executed by the electronic device according to this embodiment.

FIG. 9 is a flow chart showing an example of processing concerned with an indexing process in this embodiment.

First, the image display application 202 determines whether a still image or user motion image input is detected or not (step S91). For example, the image display application 202 detects a new still image or user motion image input by monitoring a directory in which still images or user motion images are stored. For example, the image display application 202 detects a new still image input in response to connection of an external device (such as a digital camera or a memory card) in which still images or user motion images are stored, through an interface (the aforementioned USB controller 111A, card controller 111B, or the like).

When a still image or user motion image is detected (Yes in step S91), the image display application 202 then determines whether still images used in a slide show/photo movie are extracted from the user motion images or not (step S92). The determination as to whether still images are extracted or not, may be made based on a user's instruction or determination may be made that still images are extracted automatically when new user motion images are inputted as described above.

When still images are extracted from the input user motion images (Yes in step S92), the still image extraction module 30 extracts still images from the user motion images (step S93) and sends a time stamp of each still image to the indexing module 320 of the photo movie display controller 32. With respect to extraction of still images from the user motion images, the image display application 202 may extract still images from the user motion images automatically or the user may select still images of preferable scenes from the motion images. When the user selects still images, the still image extraction module 30 may select still images from motion images based on a user's input, for example, through the touch pad 16.

Then, the still image extraction module 30 stores the extracted still images in the material database 41 (step S94).

When still images are stored in the material database 41 by the step S94, the indexing module 30 performs an indexing process about still images stored in the material database 41 (step S95). That is, the indexing module 30 analyzes still images stored in the material database 41 and stores information concerned with face images included in each still image, information concerned with an event corresponding to the still image, information of a group to which the still image belongs, etc. in the material information data 42A. In the indexing process on this occasion, the indexing module 320 performs indexing in terms of shooting date and time based on time stamps of still images received from the still image extraction module 30. Moreover, a still image is detected in step S91, and the indexing module 30 may perform an indexing process on input still images when still images are not extracted from user motion images in step S92 (or there is no user motion image for extraction).

After completion of the step S95 or when a still image or user motion image input is not detected in the step S91 (No in step S91), the aforementioned processing flow is terminated.

The still images or motion images inputted by the aforementioned process are subjected to indexing.

A process of playing back a slide show/photo movie will be described next.

Figure 10:
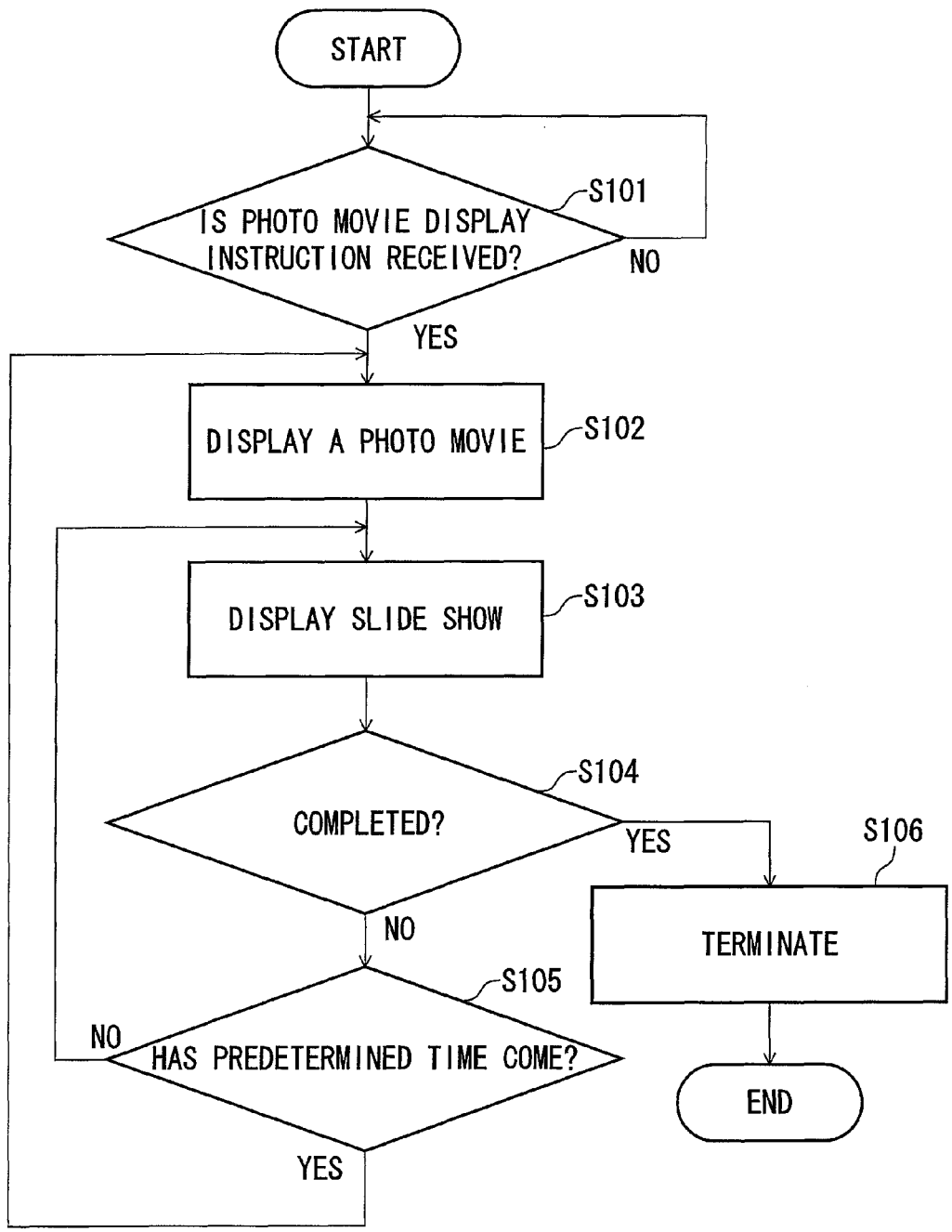
FIG. 10 is a flow chart showing an example of a slide show and photo movie playback display process executed by the electronic device according to this embodiment.

FIG. 10 is a flow chart showing an example of a slide show/photo movie playback display process performed by the image display application 202 in this embodiment.

Firstly, the display operation controller 35 of the image display application 202 determines whether a photo movie display instruction is received from the user or not (step S101). When there is no display instruction received (No in step S101), the flow goes back to the step S101.

When a photo movie display instruction is received from the user (Yes in step S101), the display operation controller 35 instructs the switching module 33 to display a photo movie, and the switching module 33 instructs the photo movie display controller 32 to generate and play back the photo movie. In response to the instruction, the photo movie display controller 32 generates and plays back the photo movie. The switching module 33 displays the photo movie played back by the photo movie display controller 32, on the LCD 17 (step S102).

When the photo movie display controller 32 displays a series of photo movies, the switching module 33 instructs the slide show display controller 31 to generate and play back a slide show. The slide show display controller 31 generates and plays back the slide show in response to the instruction.

The switching module 33 displays the slide show played back by the slide show display controller 33, on the LCD 17 (step S103).

Then, the image display application 202 determines whether a termination instruction is received from the user or not (step S104).

When there is no termination instruction received (No in step S104), the display operation controller 35 refers to time information of RTC and determines whether the current time has reached predetermined time or not (step S105).

When the current time has not reached predetermined time (No in step S105), the processing flow goes back to the step S103 so that the image display application 202 displays the slide show continuously.

When the current time has reached predetermined time (Yes in step S105), the display operation controller 35 instructs the switching module 33 to display a photo movie, and the switching module 33 instructs the photo movie display controller 32 to generate and play back the photo movie in response to the instruction. The photo movie display controller 32 generates and plays back the photo movie in response to the instruction. The switching module 33 displays the photo movie played back by the photo movie display controller 32, on the LCD 17 (step S102).

When a termination instruction is received in step S104 (No in step S104), the image display application 202 terminates the operation (step S106).

As described above, the flow of a series of processes is terminated.

In this embodiment, the display operation controller 35 switches between display of a slide show and display of a photo movie when predetermined time has come during display of the slide show. As for the timing of switching between the slide show and the photo movie, switching may be made every hour so that for example switching is made at 1 o'clock, 2 o'clock and 3 o'clock, or switching may be made at intervals of a predetermined time, for example, every 15 minutes or every 30 minutes. Switching may be set arbitrarily by the user. By this configuration, the user can be prevented from viewing a slide show continuously after the user views a photo movie first, so that the user hardly gets tired of viewing. Moreover, the user can confirm the current time by the timing of switching between the slide show and the photo movie. Moreover, when, for example, a photo movie to be displayed at 1 o'clock or a photo movie to flow at 2 o'clock is set, the user can grasp the current time more in detail. Moreover, audio is not outputted during display of a slide show but audio of BGM may be outputted during display of a photo movie. Alternatively, slow-paced quiet sound may be outputted as BGM during display of a slide show while fast-paced cheerful sound may be outputted during display of a photo movie. By this configuration, the user can easily confirm switching between the slide show and the photo movie. In addition, loud sound can be prevented from being always outputted continuously, so that the user can utilize the slide show and the photo movie comfortably.

Shooting date and time information of indexed image data is stored in the material information data 42A of the material information database 42. The photo movie display controller 32 may generate a photo movie based on this date and time information. On this occasion, the display operation controller 35 issues an instruction to display a photo movie based on the time information. The photo movie display controller 32 detects still image data 51 related to the time of the display instruction and the shooting date and time information based on the material information data 42A, and generates and displays a photo movie including the detected still images 51.

Although this embodiment has been described in the case where the photo movie display controller 32 generates a photo movie based on an instruction given from the display operation controller 35 when predetermined time has come in step S105 (FIG. 10), the present embodiment is not limited thereto. For example, the photo movie display controller 32 may generate a photo movie while the slide show display controller 31 displays a slide show in step S103. In this manner, when a photo movie is displayed in step S102 after step S105, part/all of the photo movie has been already generated so that processing time and throughput of the process on this occasion can be reduced. That is, throughput at start of playback of the photo movie on this occasion is reduced so that the photo movie can be displayed smoothly.

The image display application program 202 can display images on the LCD 17 used as a display monitor of this computer 10 or can output images on the external display device 1 through the HDMI control circuit 3 and the HDMI terminal 2.

The image display application program 202 further can output images on the external display device 1 based on DLNA through the LAN controller 108 or the wireless LAN controller 112.

In the personal computer 10 according to this embodiment, a photo movie (first image display mode) generated based on image features of images and a slide show (second image display mode) generated by application of an effect processing or the like at random can be selectively outputted. Moreover, output motion images can be switched. In this manner, the personal computer 10 can generate display of images not to bore the user and without excessive throughput.

Incidentally, all the procedure of the image output method or the image display control method according to this embodiment can be executed by software. Accordingly, when a program for executing the procedure of the image output method or the image display control method is installed and executed in a general computer through a computer-readable recording medium having the stored program, the same effect as in this embodiment can be achieved easily.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. An electronic device comprising;
   a first generator configured to generate a second image display mode in which still images are randomly switched one by one so that all of the still images are substantially uniformly selected;
   a second generator configured to generate a first image display mode in which first still images in the still images subject to image processing comprising at least one of an effect processing and a transition processing based on image feature volumes of the still images are processed; and
   a switching module configured to output either one of the first and second image display modes while switching therebetween upon elapse of a predetermined time, wherein during when the second image display mode is outputted, the second generator generates the first image display mode, and wherein when the switching module switches from the second image display mode to the first image display mode so as to output the first image display mode, the switching module outputs the first image display mode generated by the second generator during output of the second image display mode, thereby smoothing a processing load of the electronic device.

2. The electronic device of claim 1, further comprising:

a storage module configured to store the still images and the image feature volumes of the still images therein such that the still images are associated with the image feature volumes.

3. The electronic device of claim 1, wherein the switching module is configured to output audio in the first image display mode but does not output audio in the second image display mode.

4. The electronic device of claim 1, further comprising:

a storage module configured to store the still images and image feature volumes of the still images therein such that the still images are associated with the image feature volumes;

a detector configured to detect the image feature volumes of the still images; and a storage controller configured to control the storage module to store the still images and image feature volumes therein such that the still images are associated with the image feature volumes.

5. The electronic device of claim 1, further comprising:

an extraction module configured to extract the first still images from motion images, wherein the first and second generators are configured to generate the first and second image display modes using the first still images extracted from the motion images.

6. The electronic device of claim 1, further comprising:

a display module configured to display any one of the first and second image display modes.

7. The electronic device of claim 1, further comprising:

a real time clock configured to measure current time;

wherein the switching module refers to the current time and determines whether or not the current time has reached the predetermined time; and when the switching module determines that the current time has reached the predetermined time, the switching module switches between the first image display mode and the second image display mode.

8. The electronic device of claim 7, wherein when the switching module determines that the current time has reached the predetermined time, the switching module switches from the second image display mode to the first image display mode; and when the switching module determines that the current time has not reached the predetermined time, the switching module maintains the second image display mode.

9. An image output method, comprising;

generating a second image display mode in which still images are randomly switched one by one so that all of the still images are substantially uniformly selected;

switching between the second image display mode and a first image display mode when a predetermined time has elapsed, wherein image processing comprising at least one of an effect processing and a transition processing is applied to one or more first still images based on image feature volumes of the still images in the first image display mode;

generating the first image display mode, while switching from the first image display mode to the second image display mode so as to output the second image display mode; and outputting the generated first image display mode, while switching from the second image display mode to the first image display mode so as to output the first image display mode;

wherein generating the second image display mode by a first generator, switching, generating the first image display mode by a second generator, and outputting are aided by one or more processors.

10. A computer readable non-transitory medium containing program instructions for an image output method, wherein execution of the program instructions by one or more processors of a computer system causes the one or more processors to carry out the steps of:

generating a second image display mode in which still images are randomly switched one by one so that all of the still images are substantially uniformly selected;

switching between the second image display mode and a first image display mode when a predetermined time has elapsed, wherein image processing comprising at least one of an effect processing and a transition processing is applied to one or more first still images based on image feature volumes of the still images in the first image display mode;

generating the first image display mode by a second generator, while switching from the first image display mode to the second image display mode so as to output the second image display mode; and outputting the generated first image display mode, while switching from the second image display mode to the first image display mode so as to output the first image display mode.

\* \* \* \* \*